United States Patent
Barrett et al.

(10) Patent No.: US 9,440,174 B2
(45) Date of Patent: Sep. 13, 2016

(54) SILICA REDUCTION COVER

(71) Applicant: Black Bow SDR, LLC, Tulsa, OK (US)

(72) Inventors: Brian Barrett, Altus, OK (US); David Pena, Elk City, OK (US); Matthew Bataille, Jackson, MS (US)

(73) Assignee: Black Bow SDR, LLC, Tulsa, OK (US)

( * ) Notice: Subject to any disclaimer, the term of this patent is extended or adjusted under 35 U.S.C. 154(b) by 0 days.

(21) Appl. No.: 14/152,914

(22) Filed: Jan. 10, 2014

(65) Prior Publication Data
US 2014/0190356 A1    Jul. 10, 2014

Related U.S. Application Data

(60) Provisional application No. 61/751,221, filed on Jan. 10, 2013.

(51) Int. Cl.
*B01D 46/00* (2006.01)
*B01D 46/10* (2006.01)

(52) U.S. Cl.
CPC ....... *B01D 46/0004* (2013.01); *B01D 46/0005* (2013.01); *B01D 46/10* (2013.01)

(58) Field of Classification Search
CPC  B01D 39/083; B01D 46/02; B01D 46/0005; B01D 2239/1291
USPC ........ 55/385.1, 319, 515.1, 356, 418.1, 419, 55/467.1, DIG. 10; 96/135, 136, 138, 140, 96/142; 126/343.5
See application file for complete search history.

(56) References Cited

U.S. PATENT DOCUMENTS

| | | | |
|---|---|---|---|
| 5,156,662 A * | 10/1992 | Downing et al. ............... 55/493 |
| 6,221,120 B1 * | 4/2001 | Bennington et al. ........ 55/385.1 |
| 6,290,741 B1 * | 9/2001 | Lopp ............................. 55/385.2 |
| 7,332,011 B1 * | 2/2008 | Sandberg ........................ 55/491 |
| 8,870,990 B2 * | 10/2014 | Marks et al. ................. 55/385.1 |
| 2006/0168925 A1 * | 8/2006 | Whittemore .................... 55/490 |
| 2012/0304860 A1 * | 12/2012 | Matson ........................... 95/273 |

\* cited by examiner

*Primary Examiner* — Duane Smith
*Assistant Examiner* — Minh-Chau Pham
(74) *Attorney, Agent, or Firm* — Hall Estill Attorneys at Law

(57) ABSTRACT

A filter used to reduce the emission of silica particles used in hydraulic fracturing. The silica reduction cover is a custom fit filter installed onto vent hatches of proppant storage trailers. Proppant storage trailers, or "frac sanders," have a series of vent hatches that release air and fine particles into the atmosphere during material transfer operations. The silica reduction cover is comprised of filter material and permits the controlled release of high pressure air at each vent hatch while reducing sand particle loss. The silica reduction cover maintains proppant sand product in the trailer for production use while significantly reducing the emission of airborne sand particles in the immediate work and adjoining site areas. The silica reduction cover incorporates a viewing window so that workers may monitor proppant levels in the storage trailer while the silica reduction cover is installed.

20 Claims, 4 Drawing Sheets

SILICA REDUCTION COVER

PRIORITY

This application claims the priority date of U.S. Provisional Application No. 61/751,221, filed Jan. 10, 2013 and incorporated herein by reference.

FIELD OF THE DISCLOSURE

The present invention relates to a dust containment system used to reduce the emission of potential air contaminants (silica particles) associated with silica sand used in hydraulic fracturing, and includes dust control enclosures.

BACKGROUND OF THE INVENTION

Hydraulic fracturing, also commonly referred to as "hydrofracking," is a technique used in the removal of oil and natural gas from reservoirs contained in subsurface rock formations. Hydraulic fracturing works by increasing the pressure in the formation rock so that fractures form, creating a pathway through which oil and gas can travel to the well bore. Hydraulic fractures are typically created by pumping a fracturing fluid into a wellbore at a rate sufficient to increase the pressure downhole to an amount that exceeds the fracture strength of the formation rock. The increased pressure due to the high-pressure pumping of the fracturing fluid causes cracks to form in the formation rock. The fracturing fluid can then enter the cracks and extend the cracks further into the formation. Solid proppant is typically added to the fracture fluid to keep the cracks open.

The solid proppant is often a silica-containing material, such as silica sand or resin coated silica sand. Large amounts of dust are created and released into the atmosphere when proppant is prepared for use in the hydrofracking process. During preparation, large amounts of proppant are trucked into the drill site by pneumatic tankers. The proppant is then blown from the pneumatic tanker into proppant storage trailers known as "sand chiefs," "sand hogs," "sand kings," "mountain movers," or "frac sanders." The top of the proppant storage trailers incorporate a series of vent hatches which vent pressurized air as the proppant is pumped into the storage trailer. As the air is vented through the top of the storage trailer, large amounts of silica-containing dust blow out the vent hatches. The flow of dust through the vent hatches creates large dust clouds when storage trailers are filled with proppant. The dust clouds obscure vision and may create an inhalation hazard for workers at the well site.

Presently, the only method for reducing the flow of dust through the storage trailer vent hatches is use of a loose-fitting fabric filter bag that is attached to the access door. The fabric filter bag is shaped like a garbage bag that inflates with air and stands upright when proppant is loaded onto the storage trailer. The fabric filter bags are undesirable because the loose fit often causes the filter bag to be completely or partially blown off the vent hatch, allowing large amounts of dust to escape. The bags are also easily blown off the vent hatch because the bag stands upright when inflated. Additionally, use of the loose-fitting fabric filter bags is disfavored because the bags make it impossible for workers to look down into the vent hatch to monitor the amount of proppant being pumped into the storage trailer. Because of the drawbacks of the loose-fitting fabric filter bags, employees of many hydrofracking operations choose to use no filter device on proppant storage trailer vent hatches, allowing large amounts of dust to be emitted.

Accordingly, there remains a need for a filter device that may be easily used to minimize or prevent the emission of silica dust particles during the preparation of proppant for hydraulic fracturing.

SUMMARY OF THE INVENTION

The silica reduction cover overcomes the limitations associated with the prior art by providing a filter that may be easily and securely installed to prevent large amounts of dust from escaping out of proppant storage trailer access doors. The silica reduction cover is a custom fit filter installed on the lip of each proppant storage trailer vent hatch. The top of each trailer has a series of vent hatches that release air and fine particles into the atmosphere during material transfer operations. The unique silica reduction cover design, utilizing a premium filter material, permits the controlled release of high pressure air at each vent hatch while reducing sand particle loss. The silica reduction cover maintains sand product in the trailer for production reuse while significantly reducing airborne sand particles in the immediate work and adjoining site areas. The silica reduction cover incorporates a viewing window so that workers may monitor proppant levels in the storage trailer while the silica reduction cover is installed.

DETAILED DESCRIPTION

Figure 1:
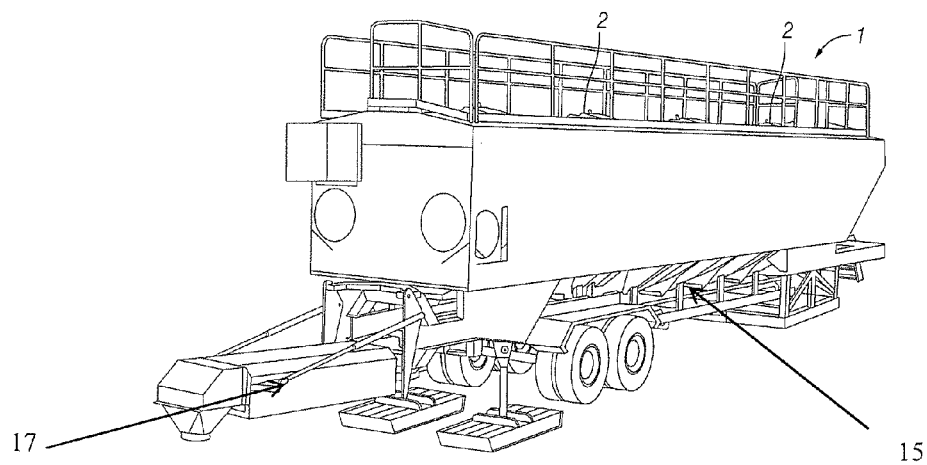
FIG. 1 is a perspective view of a proppant storage trailer or "frac sander."
Figure 2:
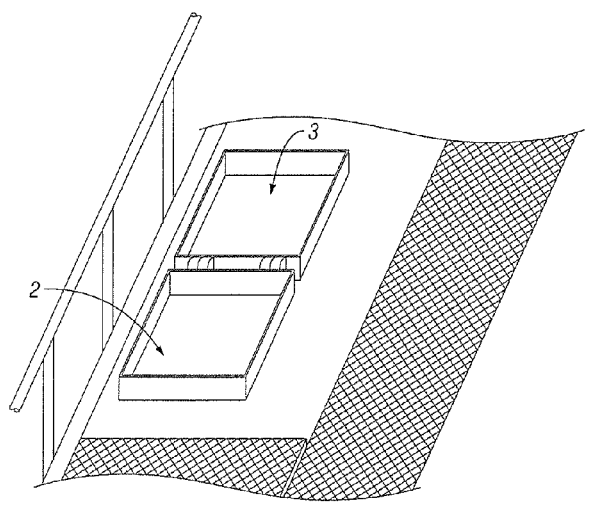
FIG. 2 is an objective view of a vent hatch located on top of a proppant storage trailer.

FIG. 1 is a perspective view of a proppant storage trailer or "frac sander" 1. Proppant is loaded into the frac sander 1 through hoses connected to a pneumatic tanker (not shown). The proppant is pushed into the frac sander 1 using compressed air. A series of vent hatches 2 are incorporated into the top of the frac sander 1 so that the pressurized air can escape. FIG. 2 depicts a vent hatch 2 and vent hatch door 3 that are located on top of the frac sander 1. The vent hatch 2 and vent hatch door 3 depicted in FIG. 2 are rectangular in shape, but other shapes may be used.

When the vent hatches 2 are open during the loading process, large amounts of dust escape through the hatches 2. When the hatches 2 are closed, the time required to load the frac sander 1 is substantially increased because the excess pressurized air cannot quickly escape from the frac sander 1. Even when the vent hatch doors 3 are closed, the pressurized air often forces the hatch doors 3 open and allows air and dust to escape.

Figure 3:
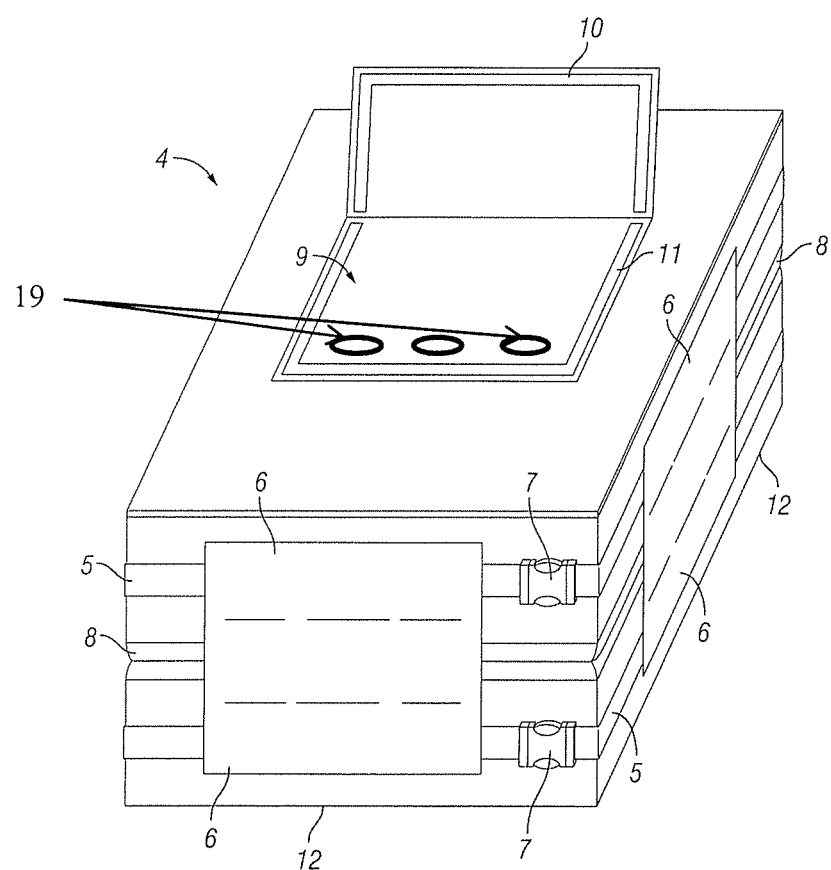
FIG. 3 is a perspective view of the Silica Reduction Cover.

The Silica Reduction Cover 4 is depicted in FIG. 3. The Silica Reduction Cover 4 is a custom fit filter that may be installed on the lip of each proppant storage trailer vent hatch 2 to prevent dust from escaping through the vent hatch 2 during the proppant loading process. The Silica Reduction Cover 4 is made of a permeable filter material adapted to release the pressurized air created when proppant is loaded into the frac sander 1 while preventing dust from escaping. The cover 4 in FIG. 3 is rectangular in shape and is sized to fit around the lip of a rectangular vent hatch 2. In other embodiments, other shapes may be used to help the silica reduction cover 4 conform to vent hatches 2 in other shapes.

Figure 4:
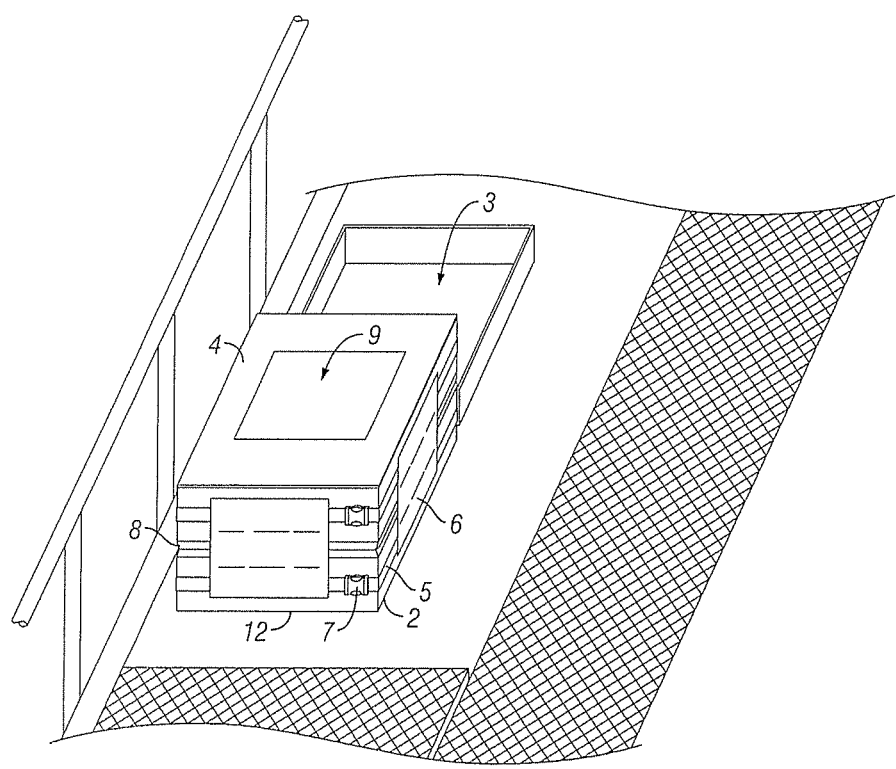
FIG. 4 is a perspective view of the Silica Reduction Cover installed on a proppant storage trailer vent hatch.

One or more straps 5 are inserted into strap loops 6 sewn around the perimeter of the cover 4. In FIG. 4 the strap loops 6 are sewn at intermittent intervals around the cover 4, but the strap loops 6 may be sewn around the entire cover 4 to form a sleeve. The ends of the straps 5 are fastened together using quick release buckles 7, but other fastening mechanisms including but not limited to ratcheting tighteners, buckle tie-downs, quick-connect straps, or bungee straps may be used. The buckles 7 are adapted to allow a user to tighten or loosen the length of strap 5 that passes through the buckle 7. The cover 4 is composed of separate pieces of filter material that may be sewn together in a pleat 8 that allows the height of the cover 4 to increase when the cover 4 is inflated by pressurized air.

One or more clear pieces of material may be sewn into the top of the cover to create one or more viewing windows 9. The viewing windows 9 allows the user to look down into the frac sander 1 to determine how much proppant has been loaded into the frac sander 1. The viewing windows 9 may be incorporated into the top or sides of the silica reduction cover 4. A cover 10 for the viewing window may also be incorporated into the top of the silica reduction cover 4. The viewing window cover 10 may be closed to prevent damage to the clear material that comprises the viewing window 9. When closed, the viewing window cover 10 may be secured by strips of hook and loop fastener 11 attached around the perimeter of the viewing window 9 and the viewing window cover 10. One or more vents 19 may be incorporated into the silica reduction cover 4 to allow excess pressure to escape. The vents 19 may be sealed using the viewing window cover 10, or an additional cover could be incorporated into the silica reduction cover 4 to seal the vents 19.

A series of magnets may be incorporated into the material at the lower edge 12 of the silica reduction cover 4 to help seal the cover to the metallic lip around the vent hatch 2. Additionally, flexible gasket material may be attached to the inner lip of the lower edge 12 of the silica reduction cover 4 to help create a stronger seal around the vent hatch 2. In one embodiment the flexible gasket material may be synthetic wool, but other appropriate materials may be used.

FIG. 4 depicts the silica reduction cover 4 installed onto a vent hatch 2. To install the cover 4, the user unbuckles the straps 5 and buckles 7 and places the silica reduction cover 4 over the vent hatch 2. Next, the user buckles and tightens the straps 5 to hold the silica reduction cover 4 in place. As pressurized air exits the hatch 2, the air will cause the silica reduction cover 4 to inflate and stand upright. The user may look through the viewing window 9 to determine when the frac sander 1 is full and the loading process is complete.

Figure 5:
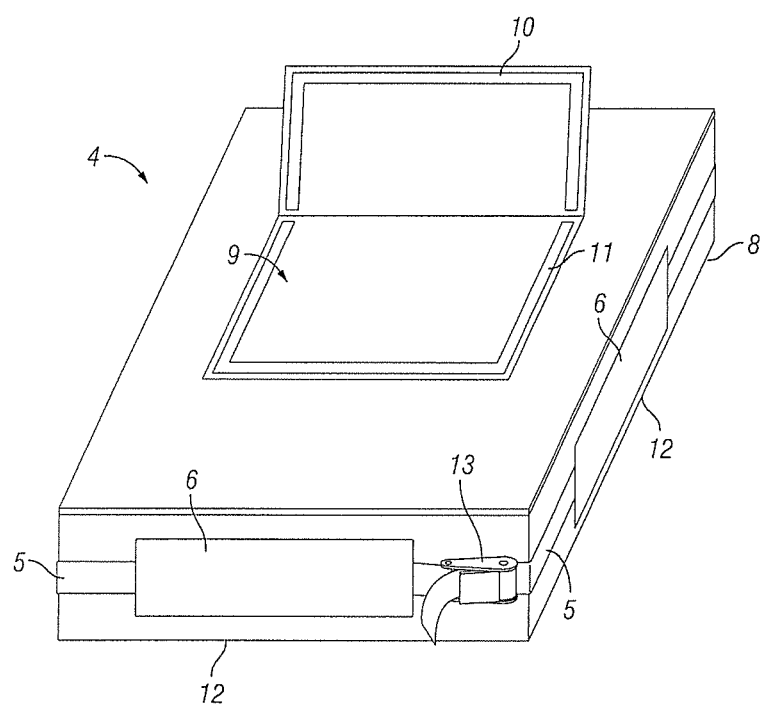
FIG. 5 is a perspective view of another embodiment of the Silica Reduction Cover.

FIG. 5 depicts another embodiment of the silica reduction cover 4. The cover 4 in FIG. 5 is rectangular in shape and is sized to fit around the lip of a rectangular vent hatch 2. The embodiment depicted in FIG. 5 has one strap 5 inserted into strap loops 6 sewn around the perimeter of the cover 4. The ends of the strap 5 are fastened together with a ratcheting strap tightener 13. The ratcheting strap tightener 13 is used to tighten the strap 5 around the lip of a vent hatch 2 to hold the silica reduction cover 4 securely in place.

The foregoing description of preferred embodiments for the silica reduction cover is presented for the purposes of illustration and description. They are not intended to be exhaustive or to limit the invention to the precise form disclosed. Obvious modifications or variations are possible in light of the above teachings. The embodiments are chosen and described in an effort to provide the best illustration of the principles of the invention and its practical applications, and to thereby enable one of ordinary skill in the art to utilize the invention in various embodiments and with various modifications as are suited to the particular use contemplated.

What is claimed is:

1. A silica reduction filter comprising:
   a cover adapted for installation on the lip of a proppant storage trailer vent hatch, the cover comprising a box-shaped structure of filter material having opposing first and second rectangular sides, opposing first and second rectangular ends extending between the respective first and second rectangular sides, and a rectangular top surface adjoining the respective first and second rectangular sides and the respective first and second rectangular ends, the rectangular top surface comprising one or more clear viewing windows, a vent aperture that extends through the top surface to an interior of the cover to allow excess pressure to escape, and a closable flap that removably covers the vent aperture; and
   means for attaching the respective first and second rectangular sides and the respective first and second rectangular ends of the cover onto the lip of a proppant storage trailer vent hatch.

2. The filter of claim 1, wherein the cover is comprised of rectangular filter fabric panels which are sewn together to form a pleat that facilitates a height of the top surface above the proppant storage trailer vent hatch to be increased responsive to application of pressure to the cover.

3. The filter of claim 1, wherein the means for attaching comprises one or more straps inserted into strap loops sewn around the lower perimeter of the cover along the respective first and second rectangular sides and the respective first and second rectangular ends.

4. The filter of claim 3, wherein the ends of the straps are fastened together using a ratcheting strap tightener.

5. The filter of claim 1, further comprising a flexible gasket material incorporated into the inside perimeter of the lower end of the cover opposite the top surface so that the flexible gasket material extends along an interior portion of each of the first and second rectangular sides and first and second rectangular ends, where the gasket material is adapted to form a tight seal between the lower end of the cover and the lip of the proppant storage trailer vent hatch.

6. The filter of claim 1, wherein a hook and loop fastener arrangement is used to secure the closable flap over the vent aperture, the hook and loop fastener arrangement configured to separate and uncover the vent aperture responsive to an overpressure condition during a proppant filling operation.

7. The filter of claim 1, further comprising an intermediate strap that surrounds a medial portion of the cover between the top surface and a lower end of the cover opposite the top surface, the intermediate strap contactingly engaging each of the first and second rectangular sides and the first and second rectangular ends to increase a hoop strength of the cover.

8. The filter of claim 1, wherein the top surface has a first overall length and a first overall width nominally corresponding to an overall length and an overall width, respectively, of the vent hatch, wherein each of the first and second rectangular sides have a second overall length corresponding to the first overall length and a second overall width less than the first overall width, and wherein each of the first and second rectangular sides have a third overall length corresponding to the first overall width and a third overall width less than the first overall width.

9. A silica reduction filter comprising:
a cover that is adapted for installation on the lip of a proppant storage trailer vent watch, where the cover is made of filter fabric and is closed on the upper end and open on the lower end, the cover comprising a box-shaped structure of filter material with opposing first and second rectangular sides, opposing first and second rectangular ends extending between the respective first and second rectangular sides, and a rectangular top surface adjoining the respective first and second rectangular sides and the respective first and second rectangular ends;
one or more straps inserted into strap loops around the lower perimeter of the cover, the strap loops respectively attached to the first and second rectangular sides and the first and second rectangular ends;
a clear viewing window incorporated into the cover, the clear viewing window having a first closeable flap removably fastenable over the window using a first attachment mechanism;
an overpressure vent aperture that extends through a selected one of the top surface, the first or second rectangular sides or the first or second rectangular ends, the overpressure vent aperture having a second closeable flap removably fastenable over the overpressure vent aperture using a second attachment mechanism; and
flexible gasket material incorporated into the inside perimeter of the lower end of the cover, where the gasket material is adapted to form a tight seal between the lower perimeter of the cover and the lip of the proppant storage trailer vent hatch.

10. The filter of claim 9, further comprising an intermediate strap that surrounds a medial portion of the cover between the top surface and a lower end of the cover opposite the top surface, the intermediate strap contactingly engaging each of the first and second rectangular sides and the first and second rectangular ends to increase a hoop strength of the cover.

11. The filter of claim 9, wherein the top surface has a first overall length and a first overall width nominally corresponding to an overall length and an overall width, respectively, of the vent hatch, wherein each of the first and second rectangular sides have a second overall length corresponding to the first overall length and a second overall width less than the first overall width, and wherein each of the first and second rectangular sides have a third overall length corresponding to the first overall width and a third overall width less than the first overall width.

12. The filter of claim 9, wherein the first and second closeable flaps are a combined flap that removably covers both the clear viewing window and the overpressure vent aperture.

13. The filter of claim 9, wherein the ends of the strap are fastened together using a ratcheting strap tightener.

14. A silica reduction filter comprising:
a cover adapted for installation on the lip of a proppant storage trailer vent hatch, the cover having a box-like construction of filter material with a rectangular closed upper end, rectangular sides and an open lower end, the cover further having a clear viewing window, a vent aperture to allow excess pressure escapement, and a closeable flap configured to be removably fastened over the viewing window and the vent aperture;
a strap configured to removably attach the cover to the lip of a proppant storage trailer vent hatch, the strap inserted into strap loops around the lower perimeter of the cover; and
a layer of flexible gasket material incorporated into the inside perimeter of the lower end of the cover to establish a fluidic seal between the lip of the proppant storage trailer vent hatch and the inside perimeter of the lower end of the cover.

15. The silica reduction filter of claim 14, wherein the cover comprises opposing first and second rectangular sides, opposing first and second rectangular ends extending between the respective first and second rectangular sides, and a rectangular top surface adjoining the respective first and second rectangular sides and the respective first and second rectangular ends, and wherein the vent aperture extends through the top surface.

16. The silica reduction filter of claim 15, wherein the top surface has a first overall length and a first overall width nominally corresponding to an overall length and an overall width, respectively, of the vent hatch, wherein each of the first and second rectangular sides have a second overall length corresponding to the first overall length and a second overall width less than the first overall width, and wherein each of the first and second rectangular sides have a third overall length corresponding to the first overall width and a third overall width less than the first overall width.

17. The silica reduction filter of claim 14, wherein the cover is comprised of rectangular filter fabric panels which are sewn together to form a pleat that facilitates a height of the top surface above the proppant storage trailer vent hatch to be increased responsive to application of pressure to the cover.

18. The silica reduction filter of claim 14, further comprising an intermediate strap that surrounds a medial portion of the cover between the top surface and a lower end of the cover opposite the top surface, the intermediate strap contactingly engaging each of the rectangular sides of the cover.

19. The silica reduction filter of claim 14, further comprising a series of magnets incorporated into the inside perimeter of the lower end of the cover to facilitate a tight seal between the lower end of the cover and the lip of the proppant storage trailer vent hatch.

20. The silica reduction filter of claim 14, wherein the cover is structurally configured to retain a free-standing box-shaped structural form responsive to application of pressure to an interior of the cover through the proppant storage trailer vent hatch during a filling operation to fill the proppant storage trailer with proppant.

* * * * *